United States Patent
Luo et al.

(10) Patent No.: US 12,404,171 B2
(45) Date of Patent: Sep. 2, 2025

(54) ALTERNATING FIXED AND FLUIDIZED BED REACTOR SYSTEMS AND PROCESSES

(71) Applicant: CHEVRON U.S.A. INC., San Ramon, CA (US)

(72) Inventors: Huping Luo, San Ramon, CA (US); Lin Li, San Ramon, CA (US); Alexander Kuperman, San Ramon, CA (US); Xiaoying Ouyang, San Ramon, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 808 days.

(21) Appl. No.: 17/683,964

(22) Filed: Mar. 1, 2022

(65) Prior Publication Data

US 2023/0278859 A1  Sep. 7, 2023

(51) Int. Cl.
*C01B 3/30* (2006.01)
*B01J 19/24* (2006.01)
*B01J 38/72* (2006.01)

(52) U.S. Cl.
CPC .......... *C01B 3/30* (2013.01); *B01J 19/2445* (2013.01); *B01J 38/72* (2013.01); *C01B 2203/1011* (2013.01); *C01B 2203/1241* (2013.01)

(58) Field of Classification Search
CPC .......... C01B 3/30; C01B 2203/1011; C01B 2203/1241; C01B 2203/0277; C01B 2203/0405; C01B 2203/0475; C01B 2203/049; C01B 2203/1047; C01B 2203/1058; C01B 2203/148; C01B 3/26; B01J 19/2445; B01J 38/72; B01J 8/025; B01J 8/065; B01J 8/26; B01J 38/30; C10G 47/00; C10G 47/36; C10G 49/002; C10G 49/26
See application file for complete search history.

(56) References Cited

U.S. PATENT DOCUMENTS

| 4,979,448 A | 12/1990 | Sheely et al. |
| 6,506,510 B1 | 1/2003 | Sioui et al. |
| 2011/0005272 A1 | 1/2011 | Wijmans et al. |

(Continued)

FOREIGN PATENT DOCUMENTS

| CN | 110642286 A | * | 1/2020 | .............. B01J 10/00 |
| GB | 2486476 A | * | 6/2012 | ......... B01D 53/0462 |
| WO | WO-2008128437 A1 | * | 10/2008 | ............ B01J 8/0055 |

OTHER PUBLICATIONS

Zhu et al (CN 110642286 translation) (Year: 2020).*
International Search Report and Written Opinion dated Jun. 23, 2023 issued in PCT/US2023/14278.

*Primary Examiner* — Prem C Singh
*Assistant Examiner* — Juan C Valencia
(74) *Attorney, Agent, or Firm* — HUNTON ANDREWS KURTH LLP

(57) ABSTRACT

The present disclosure refers to systems and methods for producing hydrogen among other products. In some embodiments the methods comprise sequentially conducting a cracking step in a fixed bed mode and conducting a flowing step in a fluidized bed mode. Such sequential processes may result in a number of advantages including, for example, regenerating the catalyst during the fluidized bed mode in a manner such that beneficial heat is generated for use in the endothermic cracking step.

24 Claims, 2 Drawing Sheets

(56) References Cited

U.S. PATENT DOCUMENTS

| | | | |
|---|---|---|---|
| 2012/0219490 A1* | 8/2012 | Noda | B01J 37/347 422/618 |
| 2013/0292300 A1 | 11/2013 | Ying et al. | |
| 2016/0075955 A1 | 3/2016 | Axens | |

* cited by examiner

ALTERNATING FIXED AND FLUIDIZED BED REACTOR SYSTEMS AND PROCESSES

FIELD OF THE DISCLOSURE

The present disclosure relates to systems and methods for producing hydrogen and/or other products using alternating fixed and fluid reactor systems and processes.

BACKGROUND AND SUMMARY

Hydrogen is one of the more important options for future clean energy. Unfortunately, many existing methods and systems for producing hydrogen are not cost-effective and/or result in greenhouse gas emissions like carbon dioxide. What is needed is a solution that produces hydrogen in a cost-effective manner. It would further be advantageous if such a solution was not energy intensive and/or did not produce substantial amounts of uncapturable carbon dioxide.

Advantageously, the instant application pertains to new systems and methods that advantageously produce hydrogen in a cost-effective manner, are not energy intensive and/or do not produce substantial amounts of uncapturable carbon dioxide.

In one embodiment the application pertains to a process for producing hydrogen and/or solid carbon. The process comprises cracking a light hydrocarbon stream in a reactor in the presence of a catalyst under conditions suitable to produce at least (1) hydrogen and (2) a carbon byproduct deposited on a surface of the catalyst. The light hydrocarbon stream is usually flowing downward and the reactor is typically in a fixed bed reactor mode in the first stage of operation during cracking. As the reaction continuous, the pressure drop across the reactor bed will increase due to the accumulation of solid carbon byproduct and the catalyst may also deactivate over time. When the conversion of the light hydrocarbon is reduced by more than 20%, or more than 30%, or more than 50%, and/or the pressure drop across the reactor is increased to over 5 psi, or over 10 psi, or 20 psi, or over 50 psi, the first stage of operation shall be relatively complete and the second stage of operation may commence. In the second stage of operation, a light hydrocarbon gas, a superheated steam, an inert gas, or a mixture thereof is flowed upward through the reactor while the reactor is in a fluidized reactor mode and while the conditions are suitable to detach at least a portion up to all of the deposited carbon byproduct from the surface of the catalyst. When the amount of solid carbon byproducts being removed from the catalyst surface has substantially diminished or stopped, the second stage of operation shall be completed and the third stage of operation shall be started. In the third stage of operation, an air, an oxygen, or a mixture of suitable oxidants is flowed upwards through the reactor to allow for regenerating catalyst by reacting an oxidant with the carbon byproduct.

In another embodiment the application pertains to a process for producing hydrogen comprising first sequentially conducting a cracking step in a fixed bed mode and then conducting a flowing step in a fluidized bed mode in a first reactor. The cracking step typically comprises cracking a light hydrocarbon stream comprising methane in a reactor in the presence of a catalyst under conditions suitable to produce at least (1) hydrogen and (2) a carbon byproduct. The light hydrocarbon stream comprising methane is flowing downward and the reactor is in a fixed bed reactor mode. The carbon and catalyst separation step generally comprises flowing a light hydrocarbon gas comprising methane, a superheated steam, an inert gas, or a mixture thereof upward through the reactor. The reactor is in a fluidized reactor mode and the superficial velocity of the flowing is sufficient to allow detaching at least a portion up to substantially all or all of the deposited carbon byproduct from the surface of the catalyst. The catalyst regeneration step comprises flowing an oxidant, such as an air, an oxygen, a steam, or any other oxidant to regenerate the catalyst by reacting an oxidant with the carbon byproduct such that heat is generated for use in the cracking step.

In another embodiment the application pertains to a reactor system comprising a reactor vessel comprising light hydrocarbon catalyst in a fixed bed configuration. The reactor vessel is configured to receive light hydrocarbon feed flowing downward to produce hydrogen while allowing carbon byproduct to be deposited on catalyst surface. The reactor vessel is configured to receive a light hydrocarbon gas, a superheated steam, or an inert gas flowing upward to fluidize the light hydrocarbon catalyst and thereafter receive an oxidizing agent to remove deposited carbon byproduct. The reactor system is configured to sequentially alternate between a fixed bed reactor mode and a fluidized bed reactor mode.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
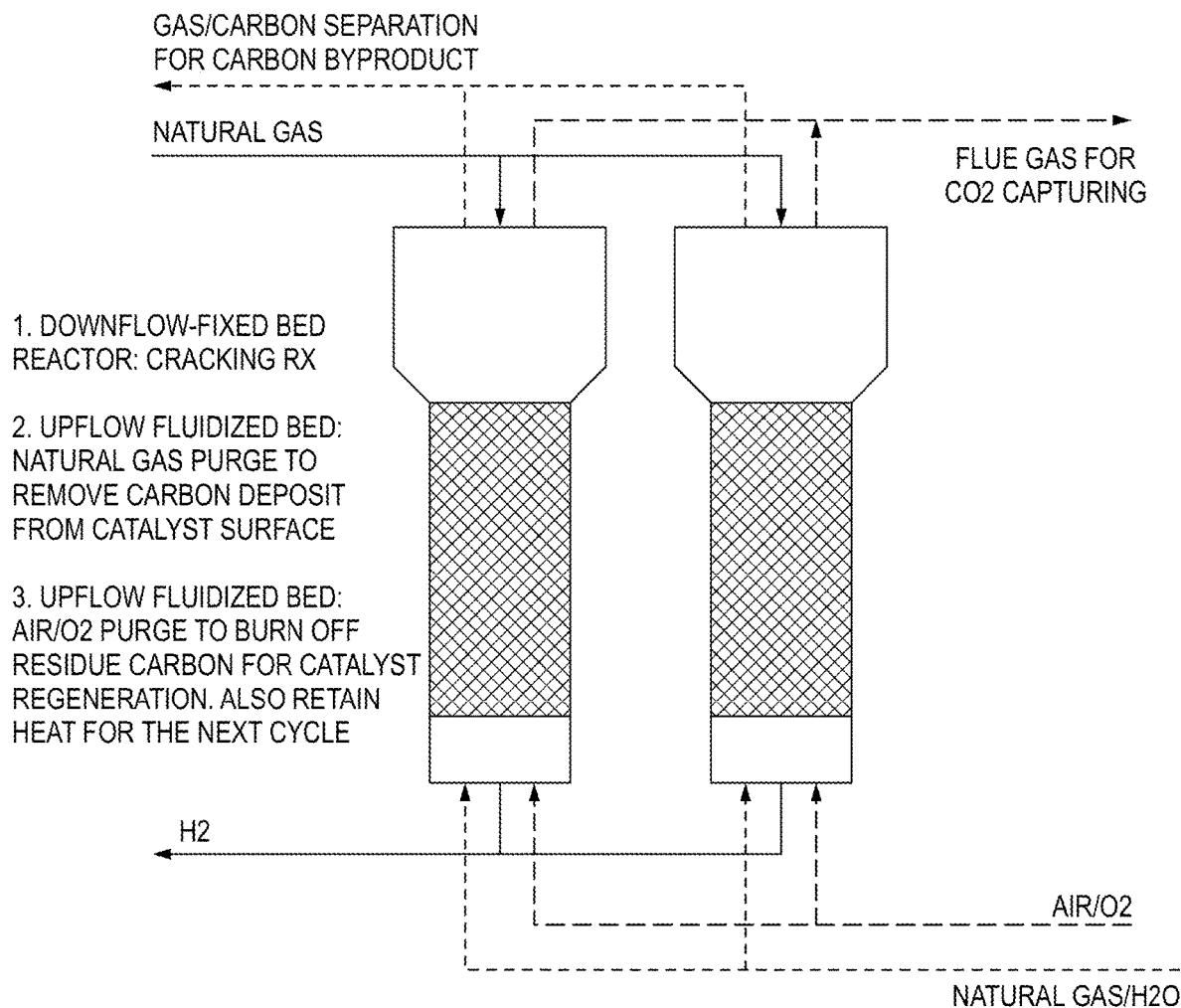
FIG. 1 shows a representative embodiment of the reactor systems and/or processes with two reactors connected in parallel.

The following description of embodiments provides a non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The instant application pertains to processes and systems for producing hydrogen and/or solid carbon among potential other products.

Cracking Step

The process generally comprises cracking a light hydrocarbon stream in a reactor in the presence of a catalyst under conditions suitable to produce at least (1) hydrogen and (2)

a carbon byproduct deposited on a surface of the catalyst. The light hydrocarbons to be employed are not particularly limited and may include, for example, $C_1$-$C_6$ or $C_1$-$C_4$ or $C_1$-$C_2$ alkanes such as methane, ethane, or natural gas either pure or in any suitable mixture with potentially minor amounts of other ingredients like carbon dioxide, sulfur compounds such as $H_2S$, water, nitrogen, and mixtures thereof. In some embodiments the light hydrocarbon stream may also comprise steam, superheated steam, an inert gas like nitrogen, or any mixture thereof. That is, the light hydrocarbons or mixtures to be employed may include any suitable composition such that the resulting product includes at least hydrogen with potentially a carbon byproduct deposited on a surface of the catalyst. A particularly useful composition may comprise a light hydrocarbon stream comprising methane or natural gas such as, for example, a light hydrocarbon stream comprising greater than about 80%, or greater than about 90%, or greater than about 95%, or greater than about 99% methane.

Suitable cracking catalysts and related suitable conditions may differ depending upon the configuration of the system, starting materials, desired products and other factors. Generally, a suitable light hydrocarbon cracking catalyst and related suitable conditions comprise any catalyst and conditions which convert a heavier hydrocarbon or hydrocarbons into a lighter hydrocarbon, carbon, or a mixture thereof. Suitable catalysts and reaction conditions may include, for example, an active carbon, an iron ore, or a metal pyrolysis catalysts such as nickel-based or iron-based catalysts, metal based catalysts having a metal such as Ni, La, Fe, Mo, Co, Pd on a support such as alumina, $TiO_2$, or $SiO_2$, unsupported Fe, iron ore (waste), active carbon and the like with temperatures above about 500° C., or above about 600° C., or above about 700° C., or above about 1000° C. according to reaction equation:

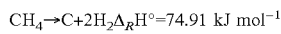

$CH_4 \rightarrow C + 2H_2 \Delta_R H° = 74.91$ kJ mol$^{-1}$

Typically, the reactor is in a fixed bed reactor mode during the cracking step. That is, a light hydrocarbon stream is flowed downward in the reactor while being heated and passed over a series of catalyst in a fixed position such as on a series of trays under the conditions described above to form (1) hydrogen and (2) a carbon byproduct deposited on a surface of the catalyst. Hydrogen may be separated in any convenient manner. In one embodiment a separator such as a membrane separator may be used to separate product hydrogen from the unreacted light hydrocarbon stream. The unreacted light hydrocarbon stream may be recycled to the inlet of the reactor. If necessary, prior to recycling the unreacted light hydrocarbon stream may be treated to remove a substantial portion of impurities that may poison the catalyst. The hydrogen may be cooled and/or further purified for shipping, storage, or use. As described further below, heat from regenerating the catalyst may be employed in the cracking step.

Flowing and Regenerating Step

After cracking in the fixed reactor mode, the reactor mode is alternated to a fluidized reactor mode. Such alternating may be done sequentially such that after the flowing regenerating step the reactor mode may be alternated back to the fixed reactor mode. In the fluidized reactor mode a light hydrocarbon gas, steam, a superheated steam, an inert gas, or a mixture thereof is flowed upward through the reactor under conditions suitable to detach at least a portion up to all of the deposited carbon byproduct from the surface of the catalyst. Subsequently, the catalyst is regenerated by reacting an oxidant with the carbon byproduct. Generally it may be desirable to remove a substantial portion of solid carbon before reacting to form $CO_2$.

The conditions for detaching the deposited carbon byproduct and reacting the oxidant may vary depending upon the specific reactor, reactants, desired products, etc. In some embodiments the conditions suitable to detach at least a portion up to all of the deposited carbon byproduct from the surface of the catalyst comprise using suitable turbulence intensity to allow breaking or shearing to detach the carbon deposit from the catalyst surface. Such turbulence may be generated in any convenient manner such as using a superficial velocity of upward flow of from about 0.05, from about 0.1, or from about 0.5 or from about 1 up to about 5, or up to about 4 meters per second. If desired, detached carbon byproduct may be separated in any convenient manner.

The oxidant employed for regenerating the catalyst is not particularly critical so long as efficient catalyst regeneration is achieved. In some embodiments air or pure oxygen may be introduced with or alternatively subsequently added to the upwardly flowing stream of light hydrocarbon gas, steam, a superheated steam, an inert gas, or mixture thereof. The regeneration reaction is typically exothermic and at least a portion of the heat generated may be used in the cracking step if desired. At least a portion up to all or nearly all of the carbon dioxide generated in the regeneration reaction may be separated or captured via, for example, a carbon dioxide capture and sequestration unit.

In some embodiments, a gas disengagement zone may be employed while in a fluidized reactor mode. If present, such a gas disengagement zone may comprise, for example, a vessel diameter configured to separate gas and solids, reduce catalyst, or both while the reactor is fluidized.

In some embodiments the disengagement zone may be configured such as to allow the separation of carbon product from catalyst particles. With a suitable gas velocity, catalyst particles may drop back to the fluidized bed zone while lighter carbon products are carried away by the gas stream. The solid carbon product can then, if desired, be separated from gas in a gas-solid separation process.

In some embodiments one or more heat exchangers may be employed. The type and location of the one or more heat exchangers may vary depending on specific process conditions and equipment. In some embodiments, one or more heat exchangers may be located between low temperature light hydrocarbon feeds and higher temperature cracking products to recover heat thereby reducing net energy requirements. Additionally or alternatively, there may be one or more heat exchangers between low temperature light hydrocarbon feeds and the higher temperature catalyst regeneration products to recover heat thereby reducing net energy requirements.

Multiple Reactors

In some embodiments it may be desirable to have two, or three, or more reactors operating in parallel conducting the methods described above. In this manner a first reactor may operate in a production mode while a second reactor operates in a regeneration mode or vice versa. By operating two or more parallel reactors in opposing modes heat may be shared thereby making the processes more efficient. For example, the heat generated by a reactor operating in a regeneration mode may be transferred to a reactor operating in a production or cracking mode which is in need of heat. Heat exchangers or other mechanisms may be employed to transfer heat between the reactors as needed.

Specific Embodiments

Figure 2:
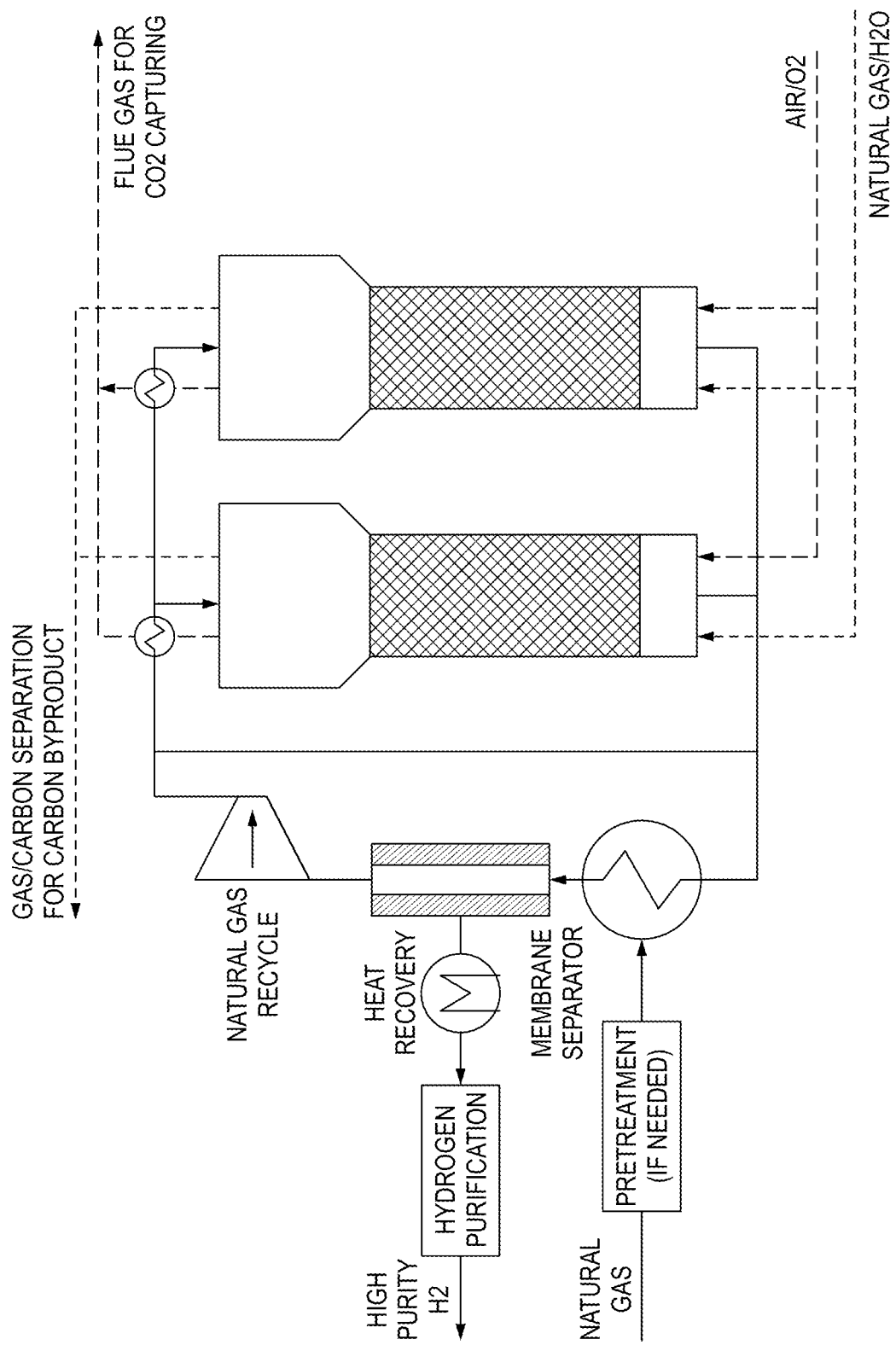
FIG. 2 shows a representative embodiment of the reactor systems and/or processes with a separator and one or more heat exchangers.

FIG. 1 shows two parallel reactors employing embodiments of the methods described above. That is, natural gas is input at the top of the reactors to flow downward and be cracked over a fixed catalyst bed mode. An upward flow in a fluidized mode removes carbon deposits from catalyst surface and an air or oxygen purge regenerates catalyst while producing heat. The modes of the two reactors are alternated such while one is in production or cracking fixed mode the other is in fluidized or regeneration mode. FIG. 2 shows additional potential embodiments that may be employed such as pre-treatment and/or heating of natural gas, a membrane separator, natural gas recycle, heat recovery, hydrogen purification, carbon dioxide capture, and/or solid carbon separation.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A process for producing hydrogen and solid carbon comprising:
   cracking a light hydrocarbon stream in a reactor in the presence of a catalyst under conditions suitable to produce at least (1) hydrogen and (2) a carbon byproduct deposited on a surface of the catalyst, wherein the light hydrocarbon stream is flowing downward and wherein the reactor is in a fixed bed reactor mode;
   flowing a light hydrocarbon gas, a superheated steam, an inert gas, or a mixture thereof upward through the reactor wherein the reactor is in a fluidized reactor mode and wherein the conditions are suitable to detach at least a portion up to all of the deposited carbon byproduct from the surface of the catalyst; and
   regenerating the catalyst by reacting an oxidant with the carbon byproduct;
   wherein the process further comprises employing at least a portion of the heat from regenerating to the cracking.

2. The process of claim 1 wherein the steps are carried out sequentially.

3. The process of claim 1 wherein the conditions suitable to detach at least a portion up to all of the deposited carbon byproduct from the surface of the catalyst comprise a superficial velocity of from about 0.05 to about 5 meters per second.

4. The process of claim 1 which further comprises employing a second reactor operating in parallel with the first reactor.

5. The process of claim 4 wherein the first reactor operates in a production mode while the second reactor operates in a regeneration mode.

6. The process of claim 4 wherein the first reactor operates in a regeneration mode while the second reactor operates in a production mode.

7. The process of claim 1 which further comprises employing a second reactor and a third reactor wherein each reactor is operating in parallel with the first reactor and wherein at least one of the first, second, and third reactors operates in a regeneration mode while at least one of the remaining first, second, and third reactors operates in a production mode.

8. The process of claim 1 wherein the inert gas is nitrogen.

9. The process of claim 1 wherein the reactor alternates between fixed bed reactor mode and fluidized reactor mode.

10. The process of claim 1 which further comprises separating hydrogen from unreacted light hydrocarbon gas, superheated steam, inert gas, or any mixture thereof.

11. The process of claim 1 which further comprises:
    separating hydrogen during the cracking step;
    separating detached carbon byproduct during the flowing step; and
    separating or capturing at least a portion up to substantially all of any carbon dioxide formed in the regenerating step.

12. The process of claim 7 which further comprises recycling unreacted light hydrocarbon gas, superheated steam, inert gas, or any mixture thereof to an inlet of the reactor.

13. The process of claim 1 which further comprises capturing at least a portion of any carbon dioxide produced.

14. The process of claim 12 further comprising operating a second reactor in parallel with the first reactor wherein the second reactor conducts a cracking step in a fixed bed mode while the first reactor conducts the flowing step.

15. The reactor system of claim 13 further comprising a second reactor operably connected in parallel.

16. The reactor system of claim 13 wherein the reactor vessel comprises a gas disengagement zone.

17. The reactor system of claim 14 wherein the gas disengagement zone comprises a vessel diameter configured to separate gas and solids, reduce catalyst, or both while the reactor vessel is fluidized.

18. The reactor vessel of claim 13 further comprises a separator configured to separate hydrogen from light hydrocarbon, natural gas, or both.

19. The reactor system of claim 13 further comprising a heat exchanger.

20. The reactor system of claim 13 further comprising a second reactor and a third reactor operably connected in parallel.

21. A process for producing hydrogen and solid carbon comprising:
    cracking a light hydrocarbon stream in a reactor in the presence of a catalyst under conditions suitable to produce at least (1) hydrogen and (2) a carbon byproduct deposited on a surface of the catalyst, wherein the light hydrocarbon stream is flowing downward and wherein the reactor is in a fixed bed reactor mode;
    flowing a light hydrocarbon gas, a superheated steam, an inert gas, or a mixture thereof upward through the reactor wherein the reactor is in a fluidized reactor mode and wherein the conditions are suitable to detach at least a portion up to all of the deposited carbon byproduct from the surface of the catalyst; and
    regenerating the catalyst by reacting an oxidant with the carbon byproduct;
    wherein the process further comprises pre-treating unreacted light hydrocarbon gas to remove a substantial portion of catalyst poisoning impurities.

22. The process of claim 21 which further comprises employing at least a portion of the heat from regenerating for cracking the light hydrocarbon.

23. A process for producing hydrogen comprising:
    (1) sequentially conducting a cracking step in a fixed bed mode and conducting a flowing step in a fluidized bed mode in a first reactor;
    wherein the cracking step comprises cracking a light hydrocarbon stream comprising methane in a reactor in the presence of a catalyst under conditions suitable to produce at least (1) hydrogen and (2) a carbon byproduct deposited on a surface of the catalyst, wherein the light hydrocarbon stream comprising methane is flowing downward and wherein the reactor is in a fixed bed reactor mode;

wherein the flowing step comprises flowing a light hydrocarbon gas comprising methane, a superheated steam, an inert gas, or a mixture thereof upward through the reactor wherein the reactor is in a fluidized reactor mode and wherein the superficial velocity of the flowing is sufficient to detach at least a portion up to all of the deposited carbon byproduct from the surface of the catalyst;

and (2) regenerating the catalyst during the flowing step by reacting an oxidant with the carbon byproduct such that heat is generated for use in the cracking step.

24. A reactor system comprising:

a reactor vessel comprising light hydrocarbon catalyst in a fixed bed configuration;

wherein said reactor vessel is configured to receive light hydrocarbon feed flowing downward to produce hydrogen while allowing carbon byproduct to be deposited on catalyst surface;

wherein said reactor vessel is configured to receive a light hydrocarbon gas, a superheated steam, or an inert gas flowing upward to fluidize the light hydrocarbon catalyst and thereafter receive an oxidizing agent to remove deposited carbon byproduct;

wherein the reactor system is configured to sequentially alternate between a fixed bed reactor mode and a fluidized bed reactor mode.

* * * * *